United States Patent
Itakura (10) Patent No.: US 8,979,195 B2
(45) Date of Patent: Mar. 17, 2015

(54) SEAT COVER AND COVER ATTACHING TOOL

(75) Inventor: Tsuyoshi Itakura, Osaka (JP)

(73) Assignee: Eleven International Co., Ltd., Osaka (JP)

( * ) Notice: Subject to any disclaimer, the term of this patent is extended or adjusted under 35 U.S.C. 154(b) by 412 days.

(21) Appl. No.: 13/530,315

(22) Filed: Jun. 22, 2012

(65) Prior Publication Data

US 2013/0062918 A1 Mar. 14, 2013

(30) Foreign Application Priority Data

Sep. 8, 2011 (JP) ................................ 2011-195851

(51) Int. Cl.
*A47C 31/00* (2006.01)
*B60N 2/60* (2006.01)

(52) U.S. Cl.
CPC .................................... *B60N 2/6027* (2013.01)
USPC ................ 297/228.13; 297/218.2; 297/218.5; 297/219.1; 297/218.3; 297/228.1

(58) Field of Classification Search
CPC .......... B60N 2/58; B60N 2/5825; B60N 2/60; B60N 2/6027
USPC .......... 297/219.1, 218.1, 284.5, 218.2, 218.3, 297/218.5, 228.1, 228.13, 229
See application file for complete search history.

(56) References Cited

U.S. PATENT DOCUMENTS

| 3,423,775 | A | * | 1/1969 | Cockerill | 5/404 |
|---|---|---|---|---|---|
| 5,401,075 | A | * | 3/1995 | Venuto et al. | 297/218.2 |
| 5,605,373 | A | * | 2/1997 | Wildern et al. | 297/218.4 |
| 5,718,478 | A | * | 2/1998 | Allison | 297/344.1 |
| 5,733,001 | A | * | 3/1998 | Roberts | 297/218.1 |
| 5,820,213 | A | * | 10/1998 | Severinski | 297/218.5 |
| 5,879,051 | A | * | 3/1999 | Cozzani | 297/218.3 |
| 6,612,648 | B1 | * | 9/2003 | Hashiguchi | 297/218.1 |
| 7,287,305 | B2 | * | 10/2007 | Bednarski | 24/297 |
| 7,891,735 | B2 | * | 2/2011 | Oku | 297/218.3 |
| 8,157,324 | B2 | * | 4/2012 | Matsuzaki et al. | 297/218.1 |
| 8,240,759 | B2 | * | 8/2012 | Hobl et al. | 297/218.1 |
| 2003/0151280 | A1 | * | 8/2003 | Hashiguchi | 297/218.1 |

FOREIGN PATENT DOCUMENTS

| JP | 01-119597 A | 5/1989 |
|---|---|---|
| JP | 03-87397 U | 9/1991 |
| JP | 11-342278 A | 12/1999 |
| JP | 2009-112698 A | 5/2009 |

* cited by examiner

*Primary Examiner* — Chi Q Nguyen
(74) *Attorney, Agent, or Firm* — Osha Liang LLP (57) ABSTRACT

A seat cover is attachable to a seat section of a vehicle seat including a frame and an original cover, in the state of covering the original cover. The original cover is attached in the state where a hook-like original cover engaging tool including a pair of portions facing each other is hooked on an engageable portion of the frame. The seat cover includes a cover main body for covering the seat section, and a cover attaching tool provided along an end of the cover main body. The cover attaching tool includes a pair of cover seat portions facing each other and is hook-like. The cover attaching tool is allowed to be hooked on the original cover engaging tool hooked on the engageable portion.

7 Claims, 11 Drawing Sheets

SEAT COVER AND COVER ATTACHING TOOL

BACKGROUND OF THE INVENTION

1. Field of the Invention

The present invention relates to a seat cover attachable to a seat section of a seat for a vehicle in the state of covering an originally provided cover, and to a cover attaching tool.

2. Description of the Prior Art

As shown in, for example, FIG. 10, a seat section 200 of a seat for a vehicle (hereinafter, referred to as the "vehicle seat") includes a metal frame 501 located on a bottom side of the seat section 200, a urethane cushion member 401 located on the frame 501, and an originally provided cover 301 formed of cloth for covering the cushion member 401 (hereinafter, the originally provided cover will be referred to as the "original cover").

The original cover 301 has an original cover engaging tool 320 provided along a bottom end 312. The original cover engaging tool 320 is hooked on an engageable portion 520 of the frame 501 of the seat section 200. Thus, the original cover 301 is attached in the state of covering the cushion member 401 (see Patent Documents Nos. 1 through 4).

In more detail, the engageable portion 520 of the frame 501 is inverted-U-shaped as seen in a bottom view and extends downward generally in a plate-like manner. The original cover engaging tool 320 of the original cover 301 is also inverted-U-shaped as seen in a bottom view so as to correspond to the shape of the engageable portion 520 of the frame 501. The original cover engaging tool 320 of the original cover 301 includes a pair of portions which face each other and have different heights from each other. The original cover engaging tool 320 has a hook-like transverse cross-section and is formed of a synthetic resin. Among the pair of portions, a higher portion is sewn along the bottom end 312 of the original cover 301.

The original cover engaging tool 320 having the hook-like transverse cross-section includes an appropriate stopper protrusion 353 in a portion 352 facing the higher portion, and the engageable portion 520 includes a stopper portion 521 engageable with the stopper protrusion 353.

As described above, the original cover engaging tool 320 and the engageable portion 520 are formed to be inverted-U-shaped as seen in a bottom view, and respectively include the stopper protrusion 353 and the stopper portion 521, for example. With this structure, the original cover engaging tool 320 is strongly secured to, and hooked on, the engageable portion 520 such that the original cover 301 is not easily disengaged from the frame 501.

Conventionally, a luxurious-appearing seat cover having the same shape as that of the original cover 301 is attached to the seat section 200 in the state of covering the original cover 301.

Figure 11:
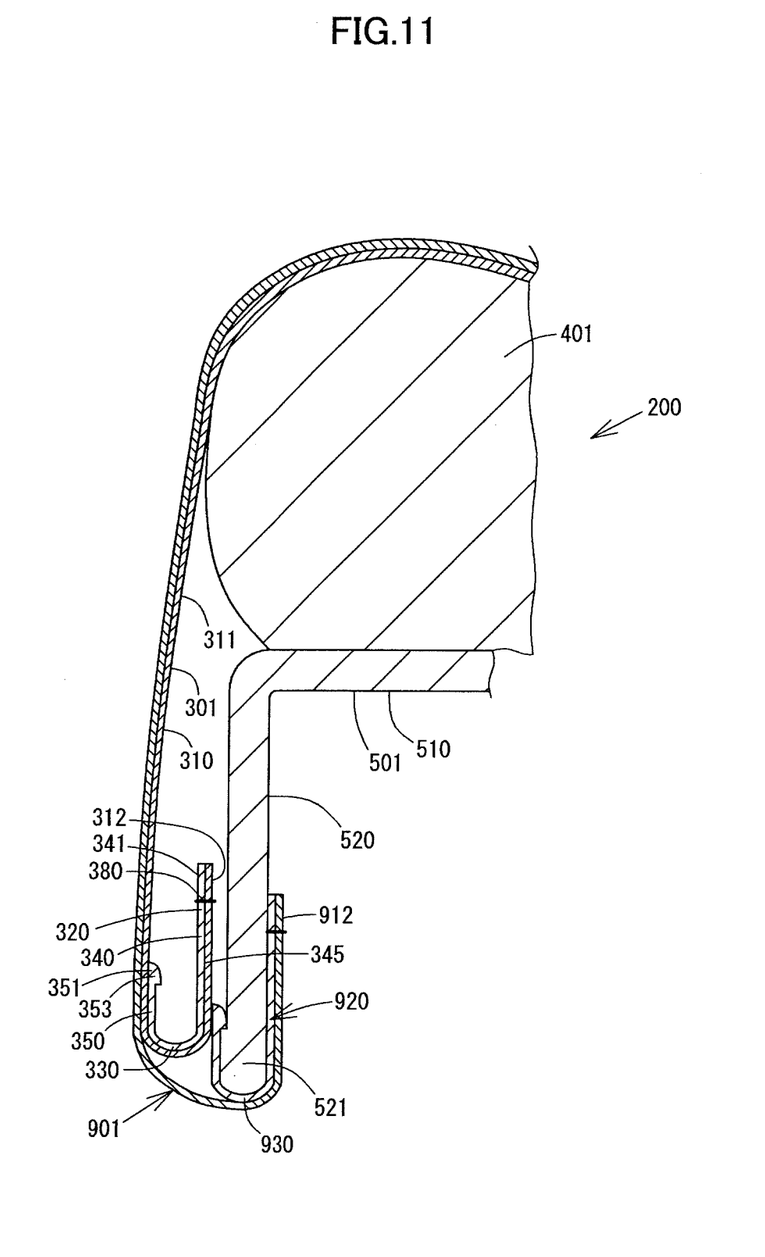
FIG. 11 shows a cross-section of a conventional seat cover in an attached state.

Such a seat cover 901 includes, as shown in, for example, FIG. 11, a cover attaching tool 920 provided along a bottom end 921 thereof. The cover attaching tool 920 has substantially the same structure as that of the original cover engaging tool 320. The original cover engaging tool 320 is detached from the engageable portion 520 of the frame 501, and instead, the cover attaching tool 920 is hooked on the engageable portion 520. Thus, the seat cover 901 is attached to the seat section 200.

However, it is difficult and needs time and labor to attach the seat cover 901 because the original cover engaging tool 320 which is strongly secured to, and hooked on, the engageable portion 520 needs to be detached and the cover attaching tool 920 needs to be hooked on the generally plate-like engageable portion 520 located on the bottom side of the seat section 200 in a small space in the vehicle.

PRIOR ART DOCUMENT

Patent Document

Patent Document 1: Japanese Laid-Open Patent Publication No. 2009-112698
Patent Document 2: Japanese Laid-Open Patent Publication No. Hei 11-342278
Patent Document 3: Japanese Laid-Open Utility Model Publication No. Hei 3-87397
Patent Document 4: Japanese Laid-Open Utility Model Publication No. Hei 1-119597

SUMMARY OF THE INVENTION

Problems to be Solved by the Invention

Thus, the present invention has an object of providing a seat cover attachable to a seat section of a vehicle seat in the state of covering an original cover with no need to detach an original cover engaging tool from an engageable portion of the seat section.

Means for Solving the Invention

The present invention is directed to a seat cover which is attachable to a seat section of a vehicle seat, including a frame and an original cover, in the state of covering the original cover, which is attached in the state where a hook-like original cover engaging tool including a pair of portions facing each other is hooked on an engageable portion of the frame. The seat cover includes a cover main body for covering the seat section; and a cover attaching tool provided along an end of the cover main body. The cover attaching tool includes a pair of cover seat portions facing each other and is hook-like; and the cover attaching tool is allowed to be hooked on the original cover engaging tool hooked on the engageable portion.

According to the present invention, the seat cover can be attached to the seat section of the vehicle seat in the state of covering the original cover with no need to detach the original cover engaging tool from the engageable portion.

In more detail, the seat cover includes the cover attaching tool, which can be hooked on the original cover engaging tool, along the end of the cover main body. Owing to this, the seat cover can be attached to the seat section by covering the seat section with the cover main body, pulling the cover attaching tool downward, and hooking the cover attaching tool on the original cover engaging tool, which is hooked on the engageable portion.

Accordingly, the seat cover can be attached to the seat section of the vehicle seat in the state of covering the original cover with no need to detach the original cover engaging tool from the engageable portion.

In an embodiment of the present invention, an opening width of an opening between one end portions of the pair of seat cover portions may be larger than a thickness of the original cover at a position of the original cover engaging tool hooked on the engageable portion.

According to the present invention, the cover attaching tool can be hooked, with no need of precise position alignment, on the original cover engaging tool, which is hooked on the engageable portion located on the bottom side of the seat section, which is a blind spot. Therefore, the seat cover can be attached to the seat section of the vehicle seat easily.

In an embodiment of the present invention, at least one of the pair of seat cover portions may include a protrusion which protrudes toward the other of the pair of seat cover portions and is engageable with the original cover engaging tool, or holds the original cover engaging tool together with the other of the pair of seat cover portions.

According to the present invention, by adjusting the deflection amount of the protrusion, the cover attaching tool can be hooked on the original cover engaging tool having any of various thicknesses, which is hooked on the engageable portion.

In an embodiment of the present invention, the protrusion may protrude toward a connection portion for connecting another end portions of the pair of seat cover portions to each other.

According to the present invention, the cover attaching tool can be easily hooked on the original cover engaging tool in the state where the original cover engaging tool is held by, or is engaged with, the protrusion, and also the cover attaching tool can be prevented with certainty from coming off from the original cover engaging tool.

In an embodiment of the present invention, a plurality of the protrusions may be provided in an opening depth direction of the cover attaching tool.

According to the present invention, the cover attaching tool can be secured strongly to the original cover engaging tool, which is hooked on the engageable portion. Therefore, the degree of tension of the cover main body can be adjusted by adjusting the position in the opening depth direction at which the cover attaching tool is hooked.

In an embodiment of the present invention, a minimum distance between the pair of seat cover portions may be shorter than the thickness of the original cover at a position of the original cover engaging tool hooked on the engageable portion.

According to the present invention, the cover attaching tool can be hooked, with no need of precise position alignment, on the original cover engaging tool, and also the position of the cover attaching tool can be secured with respect to the original cover engaging tool.

The present invention is also directed to a seat cover attaching tool included in a seat cover which is attachable to a seat section of a vehicle seat, including a frame and an original cover, in the state of covering the original cover, which is attached in the state where a hook-like original cover engaging tool including a pair of portions facing each other is hooked on an engageable portion of the frame. The cover attaching tool includes a pair of seat cover portions facing each other and is hook-like; and the cover attaching tool is allowed to be hooked on the original cover engaging tool hooked on the engageable portion.

Effect of the Invention

According to the present invention, a seat cover attachable to a seat section of a vehicle seat in the state of covering an original cover with no need to detach an original cover engaging tool from an engageable portion of the seat section can be provided.

DESCRIPTION OF THE PREFERRED EMBODIMENTS

Embodiment 1

With reference to FIGS. 1 through 7 and FIG. 10, a seat cover 1 in Embodiment 1 according to the present invention will be described.

Figure 1:
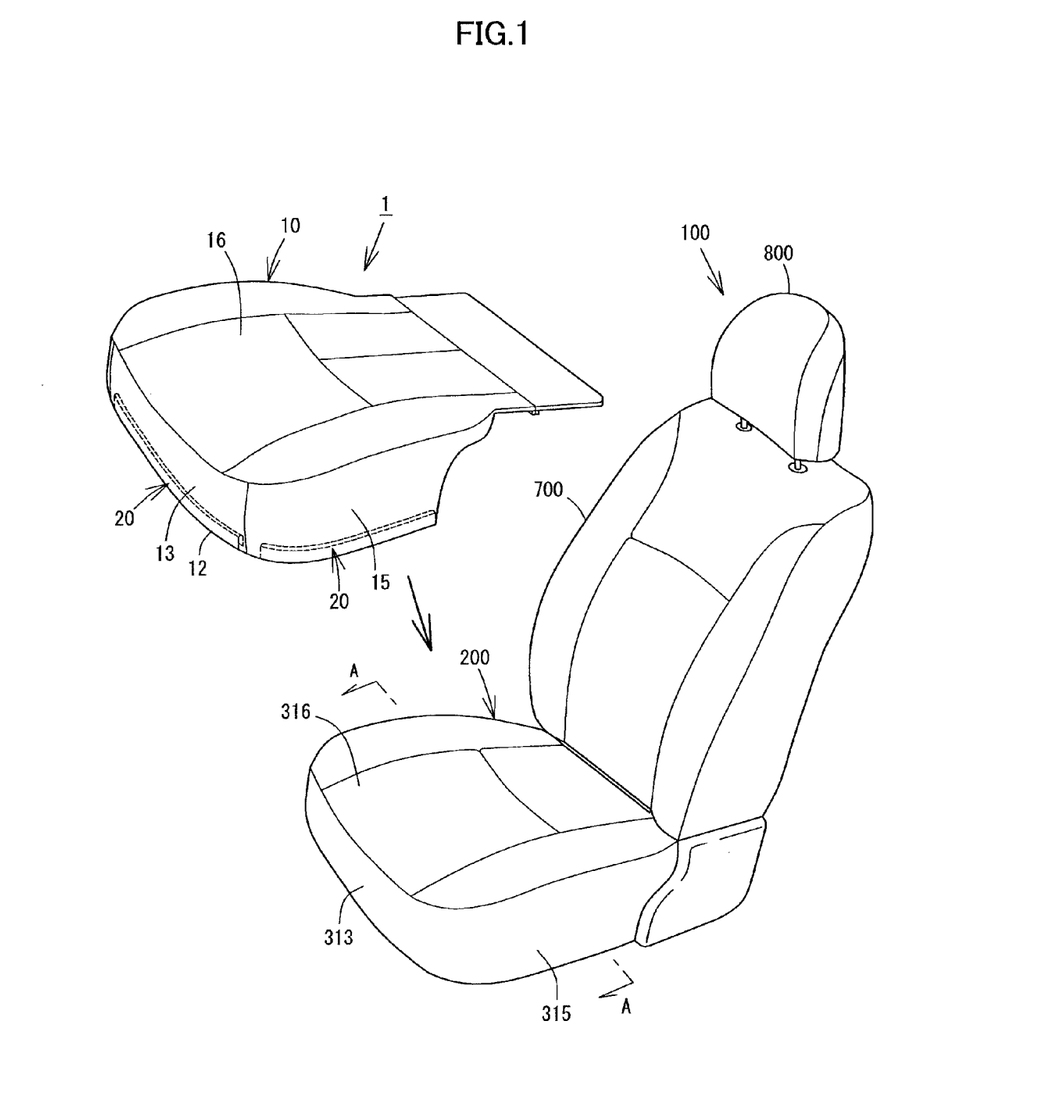
FIG. 1 is an isometric view of a seat cover including cover attaching tools and of a vehicle seat.
Figure 2:
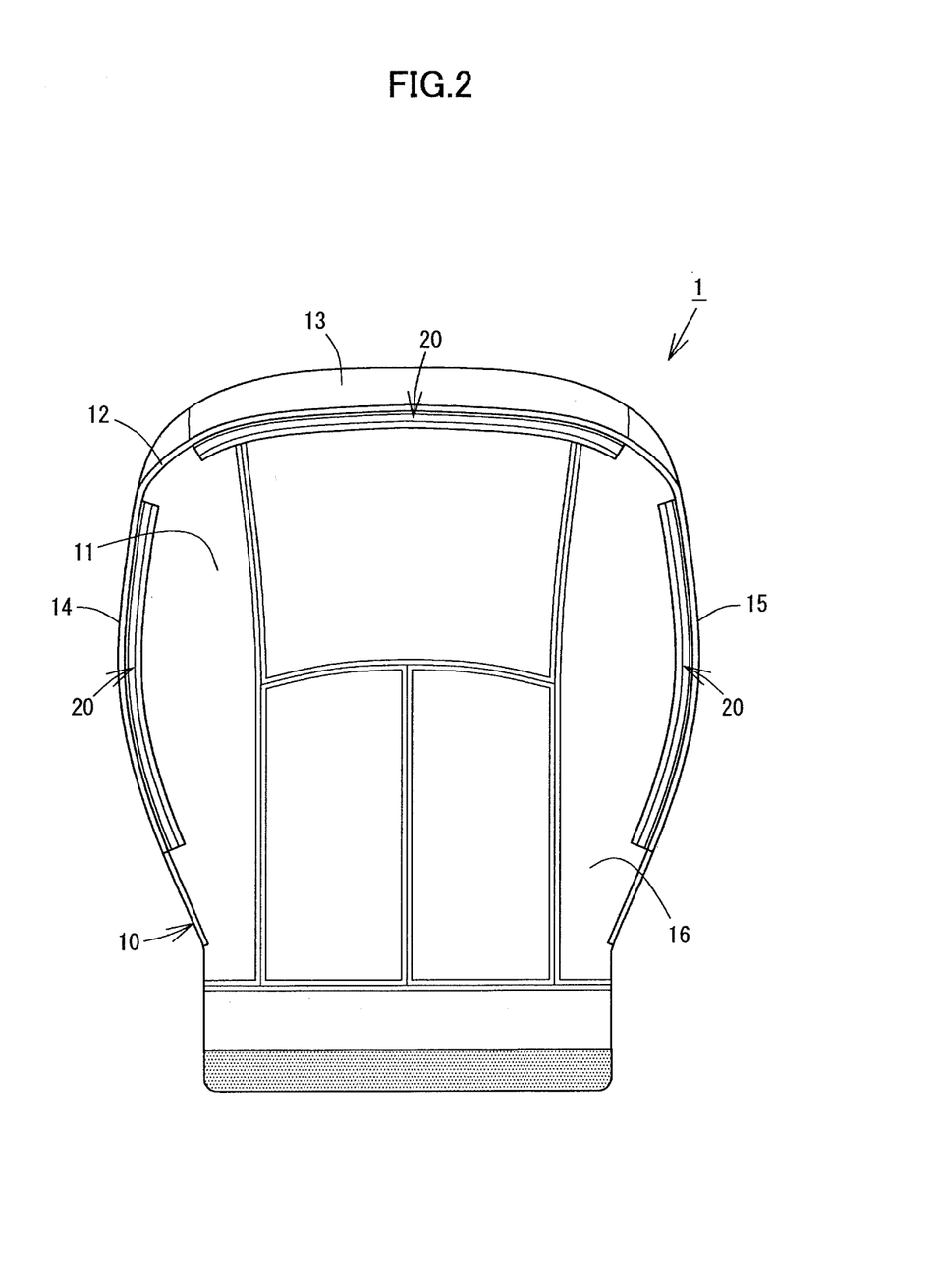
FIG. 2 is a bottom view of the seat cover including the cover attaching tools.

FIG. 1 is an isometric view of a seat cover 1 including cover attaching tools 20 and of a vehicle seat 100. FIG. 2 is a bottom view of the seat cover 1 including the cover attaching tools 20.

Figure 3A:
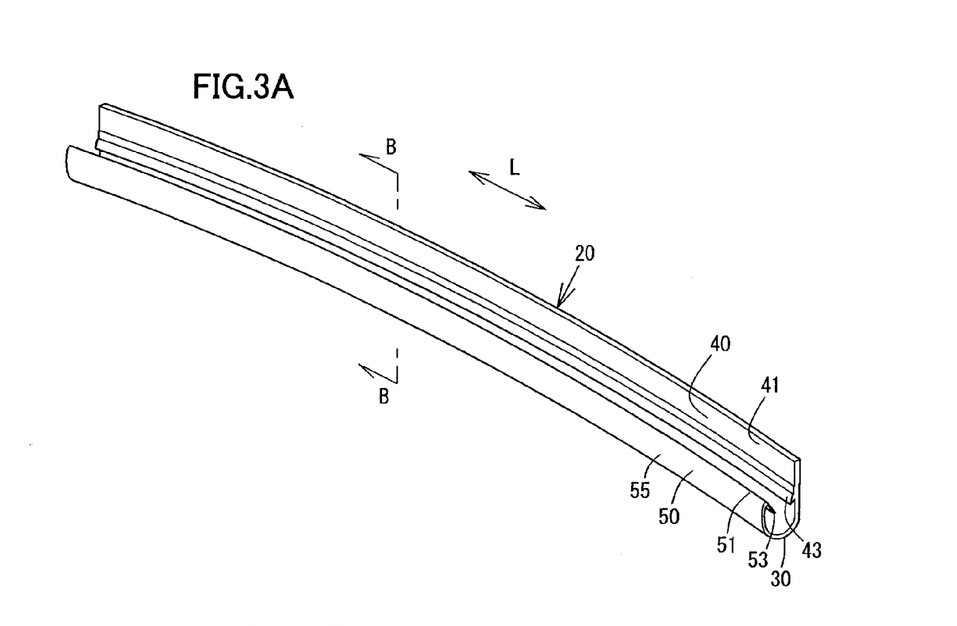
FIG. 3 is a view illustrating the cover attaching tool.
Figure 3B:
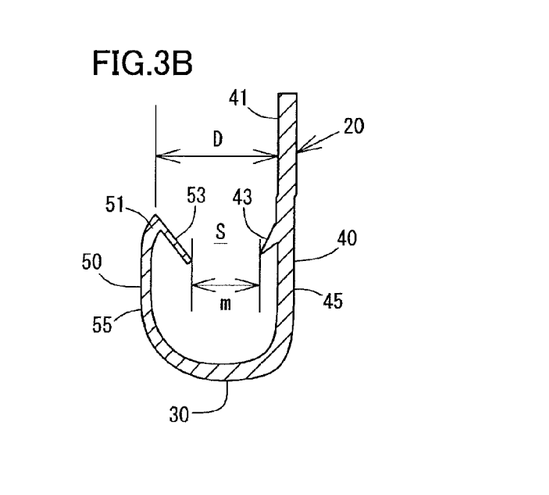

FIG. 3 illustrates the cover attaching tool 20. In more detail, FIG. 3A is an isometric view of the cover attaching tool 20, and FIG. 3B shows an enlarged cross-section taken along line B-B in FIG. 3A.

Figures 4A, 4B:
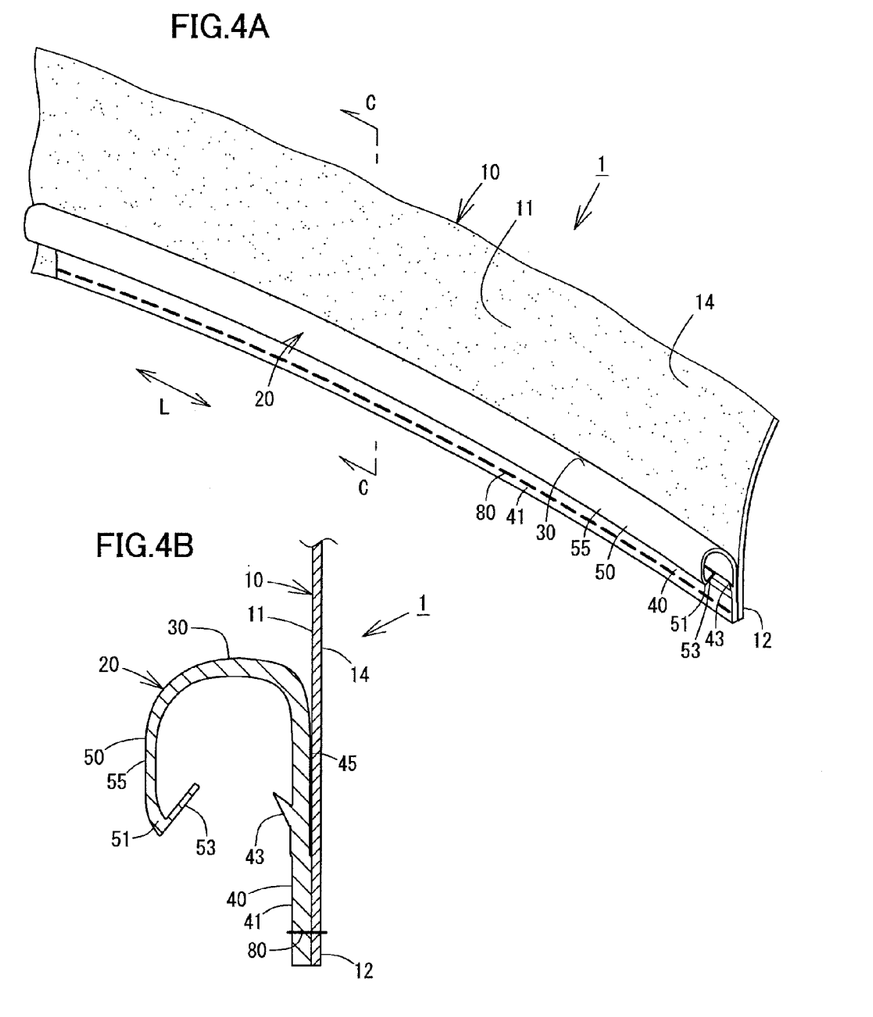
FIG. 4 is a view showing the cover attaching tool sewn to a cover main body.

FIG. 4 shows the seat cover 1 in the state where the cover attaching tool 20 is sewn to a cover main body 10. In more detail, FIG. 4A is an isometric view of a right side part 14 of the seat cover 1 as seen from a rear surface 11 of the cover main body 10. FIG. 4B shows an enlarged cross-section taken along line C-C in FIG. 4A.

Figure 5:
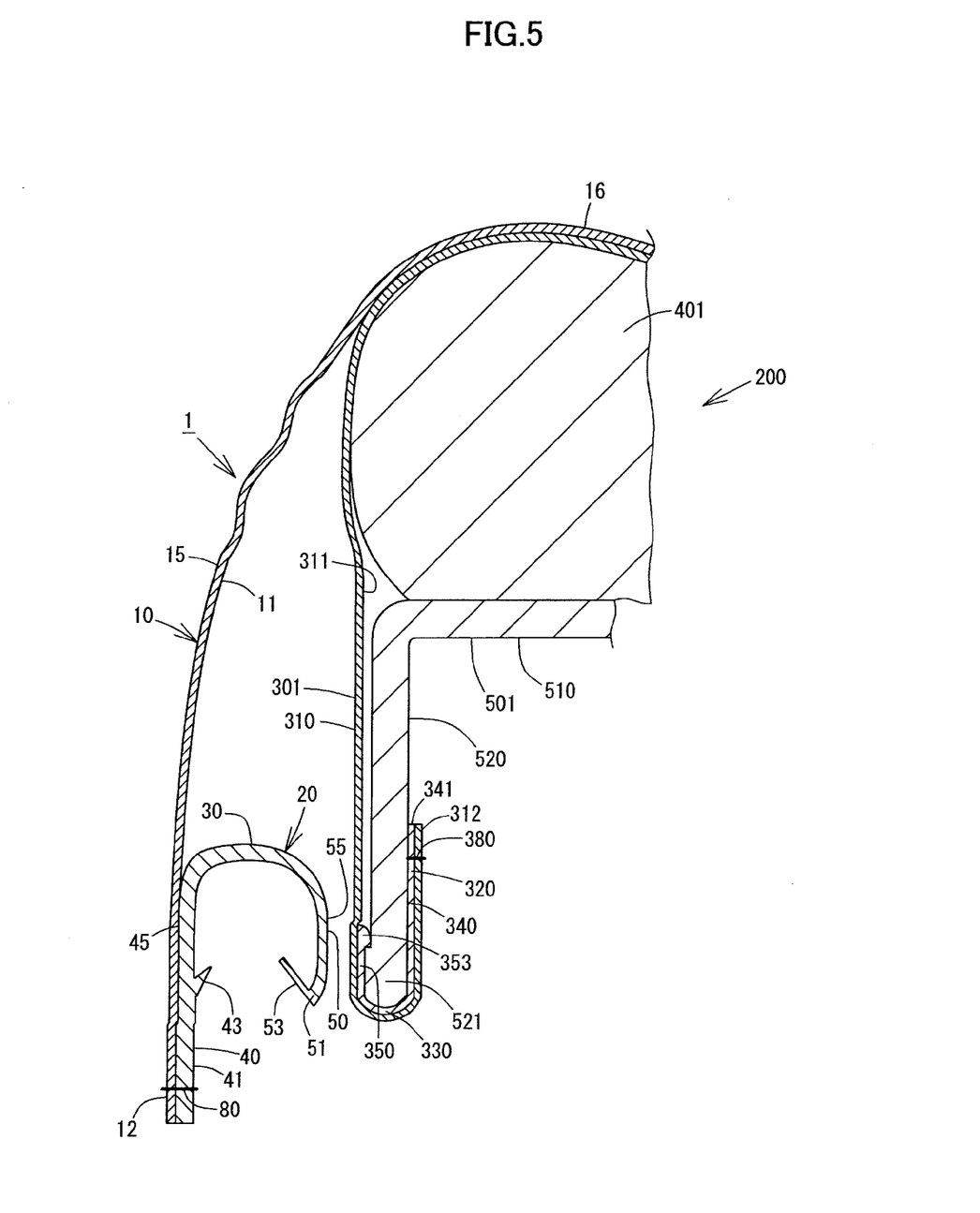
FIG. 5 shows a cross-section of the seat cover in the middle of being attached to a seat section of the vehicle seat.
Figure 6:
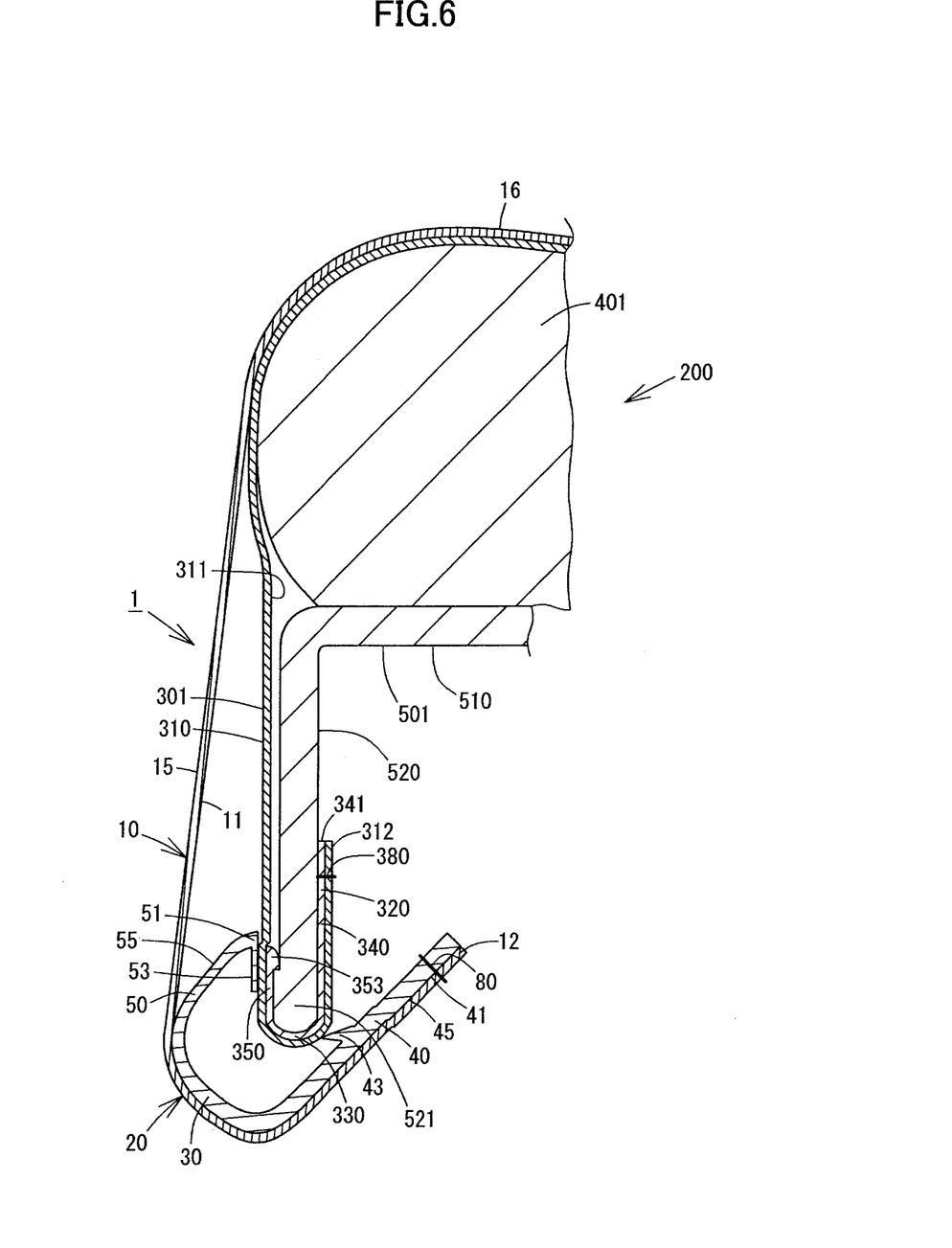
FIG. 6 shows a cross-section of the seat cover in the middle of being attached to the seat section of the vehicle seat.
Figure 7:
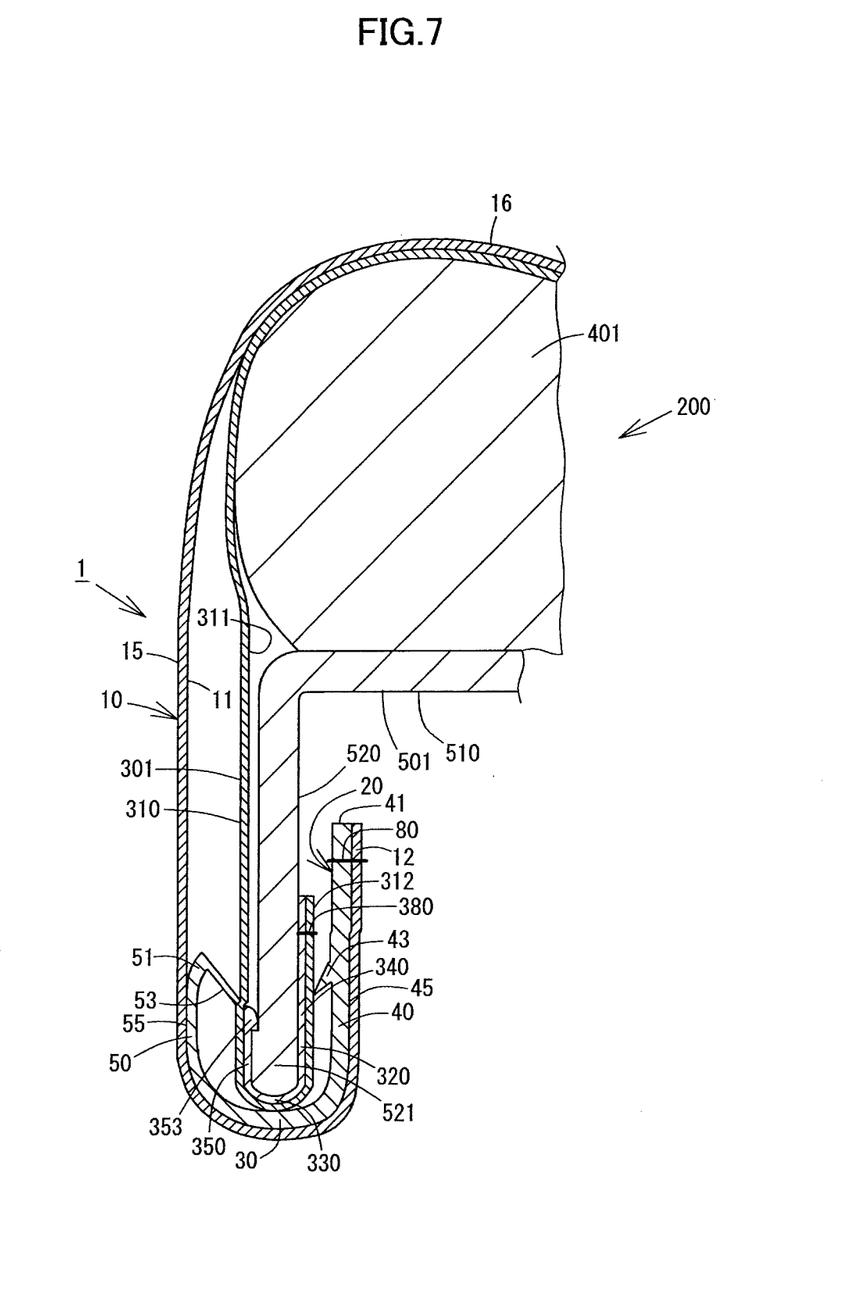
FIG. 7 shows a cross-section of the seat cover attached to the seat section of the vehicle seat.

FIG. 5 and FIG. 6 each show an enlarged partial cross-section of the seat cover 1 in the middle of being attached to a seat section 200 of the vehicle seat 100. The enlarged cross-section of FIG. 5 and FIG. 6 correspond to an enlarged cross-section taken along line A-A in FIG. 1 as viewed in the direction of the arrows of line A-A. FIG. 7 shows an enlarged partial cross-section of the seat cover 1 attached to the seat section 200 of the vehicle seat 100.

Figure 10:
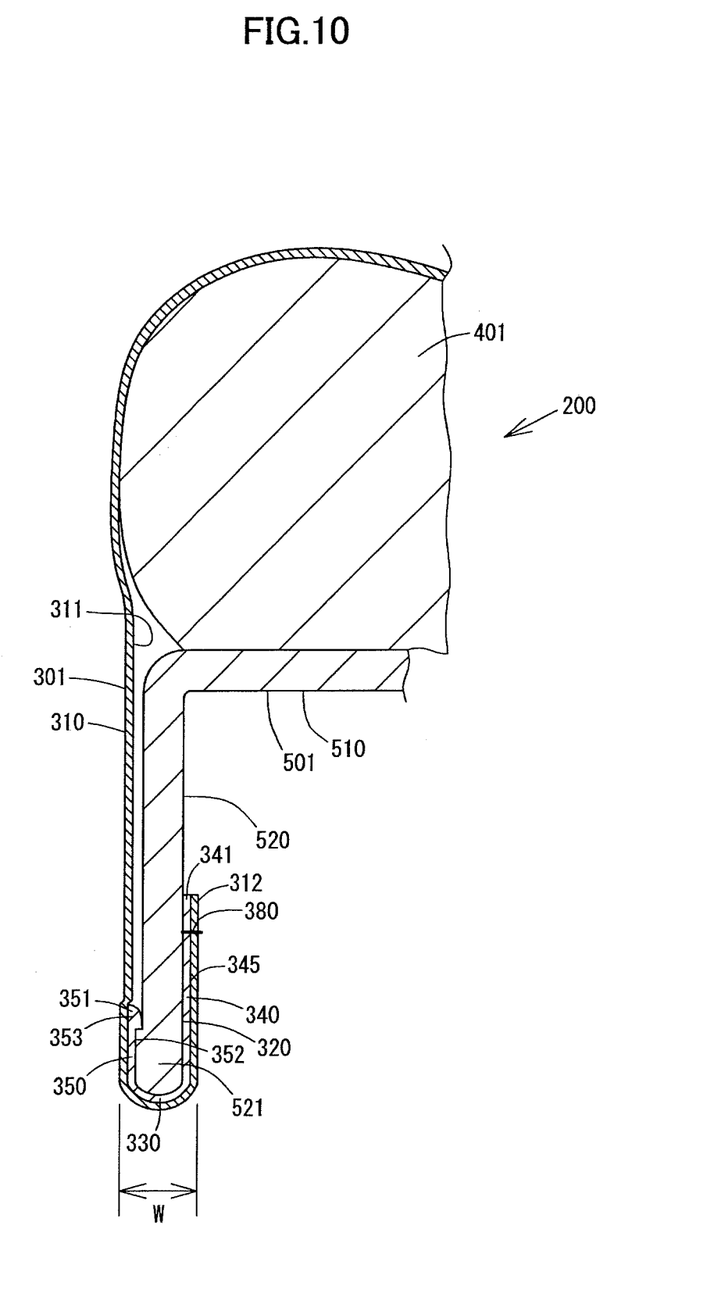
FIG. 10 shows an enlarged cross-section taken along line A-A in FIG. 1 as viewed in the direction of the arrows of line A-A.

FIG. 10 shows an enlarged cross-section taken along line A-A in FIG. 1 as viewed in the direction of the arrows of line A-A.

As shown in FIG. 1, the vehicle seat 100 includes the seat section 200, a backseat 700, a headrest 800 and the like.

As shown in FIG. 10, the seat section 200 of the vehicle seat 100 on which the seat cover 1 is to be attached includes the metal frame 501 located on the bottom side of the seat section 200 and forming a framework of the seat section 200, the urethane cushion member 401 located on the frame 501, and the original cover 301 formed of cloth for covering the cushion member 401 and the frame 501.

The frame 501 includes a flat portion 510 having a generally square shape as seen in a plan view and the engageable portion 520 extending downward in a plate-like manner from a front end and two side ends of the flat portion 510. The engageable portion 520 is inverted-U-shaped as seen in a bottom view. The engageable portion 520 includes the stopper portion 521 at a bottom end thereof. The stopper portion 521 is formed to have a larger width in a transverse cross-section than the rest of the engageable portion 520.

The original cover 301 includes an original cover main body 310 and the original cover engaging tool 320 provided along the bottom end 312 of a rear surface 311 of the original cover main body 310.

The original cover main body 310 includes a seating portion 316 on which a passenger is to sit, a front portion 313 extending downward from a front end of the seating portion 316, and right and left side portions 315 extending downward from two side ends of the seating portion 316. The seating portion 316 is square as seen in a plan view. The seating portion 316, the front portion 313, and the right and left side portions 315 are provided by sewing cloth members. The front portion 313 and the right and left side portions 315 form an inverted U shape as seen in a bottom view. In all the figures in this specification, seams along which these portions are sewn together are omitted.

The original cover engaging tool 320 has a lengthy shape having a length along the bottom end 312 of the original cover main body 310, and is formed of a resin. The bottom end 312 is inverted-U-shaped as seen in a bottom view. The original cover engaging tool 320 is flexible and deformable to be U-shaped in a longitudinal direction thereof.

The original cover engaging tool 320 includes a first side portion 340 and a second side portion 350 which face each other, and also a connection portion 330 for connecting bottom ends thereof to each other. The original cover engaging tool 320 has a hook-like transverse cross-section.

The first side portion 340 and the second side portion 350 of the original cover engaging tool 320 are distanced from each other by a length which is equal to a width, in the transverse direction, of the stopper portion 521 of the engageable portion 520. In the original cover engaging tool 320, the first side portion 340 is higher than the second side portion 350 in the transverse cross-section.

The second side portion 350 of the original cover engaging tool 320 includes a free end portion 351, and the free end portion 351 includes the stopper protrusion 353 protruding toward the first side portion 340. The original cover engaging tool 320 has a uniform shape in the longitudinal direction thereof.

The original cover engaging tool 320 is attached to the original cover main body 310 in the state where an outer surface 345 of the first side portion 340 of the original cover engaging tool 320 is in contact with the rear surface 311 of the original cover main body 310 and also a free end portion 341 of the first side portion 340 is aligned with the bottom end 312 of the original cover main body 310. The free end portion 341 and the bottom end 312 are sewn together with a sewing thread 380. The original cover engaging tool 320 is attached along the bottom end 312 of the original cover main body 310 in an inverted U shape as seen in a bottom view.

The original cover 301 is attached in the state where the bottom end 312 of the original cover main body 310 is rolled inside the engageable portion 520. More specifically, the original cover engaging tool 320 is hooked such that the first side portion 340 is rolled inside the engageable portion 520.

The original cover engaging tool 320 is hooked on the engageable portion 520 with no gap. More specifically, the original cover engaging tool 320 is hooked in the state where the stopper protrusion 353 is engaged with stopper portion 521 of the engageable portion 520.

As shown in FIG. 1 through FIG. 4, the seat cover 1 to be attached to the seat section 200 of the vehicle seat 100 includes the cover main body 10 for covering the seat section 200 and the cover attaching tools 20 provided along a bottom end 12 of the rear surface 11 of the cover main body 10.

The cover main body 10 is sewn to cover the seat section 200 with no gap and is formed of a synthetic leather. In all the figures in this specification, seams along which the portions of the cover main body 10 of a synthetic leather are sewn together are omitted.

In more detail, the cover main body 10 includes a seating portion 16 for covering the seating portion 316 of the seat section 200, a front portion 13 extending downward from a front end of the seating portion 16 to cover the front portion 313 of the seat section 200, and right and left side portions 14 and 15 extending downward from two side ends of the seating portion 16 to cover the right and left side portions 315. The front portion 13 and the right and left side portions 14 and 15 form an inverted U shape as seen in a bottom view.

The cover attaching tools 20 are each molded to be lengthy and to be hook-like in a transverse cross-section, and are formed of a synthetic resin.

In more detail, the cover attaching tools 20 are lengthy and have lengths which are approximately equal to the length of the bottom end 12 of the front portion 13, the right side portion 14 and the left side portion 15 of the cover main body 10, respectively.

The cover attaching tools 20 each include a first side portion 40 and a second side portion 50 which face each other, and also a bottom portion 30 for connecting bottom ends thereof to each other. The cover attaching tools 20 each have a hook-like transverse cross-section.

In each cover attaching tool 20, the first side portion 40 is higher than the second side portion 50 in the transverse cross-section. The cover attaching tool 20 has an opening S in the vicinity of a free end portion 51 of the second side portion 50.

The first side portion 40 and the second side portion 50 of the cover attaching tool 20 are lengthy in a longitudinal direction L and substantially flat-plate-like. The first side portion 40 and the second side portion 50 of the cover attaching tool 20 are distanced from each other by an opening S, and an opening width D of the opening S is larger than a thickness W of the original cover 301 at the position of the original cover engaging tool 320 hooked on the engageable portion 520. More specifically, the "thickness W" refers to, as shown in FIG. 10, a distance from an outer surface of a portion of the original cover main body 310 which is on one of the pair of portions of the original cover engaging tool 320 and an outer surface of another portion of the original cover main body 310 which is on the other of the pair of portions of the original cover engaging tool 320.

In the cover attaching tool 20, the first side portion 40 and the connection portion 30 are connected to each other in a curve in a transverse cross-section, and the second side portion 50 and the connection portion 30 are also connected to each other in a curve in a transverse cross-section.

The second side portion 50 of the cover attaching tool 20 has a second protrusion 53 protruding from the free end portion 51 thereof toward the first side portion 40 and the connection section 30. The cover attaching tool 20 also has a first protrusion 43 protruding toward the second side portion 50 and the connection section 30 at the same height position as that of the second protrusion 53 of the second side portion 50.

A minimum distance m between the first side portion 40 and the second side portion 50 of the cover attaching tool 20, namely, the distance m between the first protrusion 43 and the second protrusion 53 is shorter than the thickness W of the original cover 301 at the position of the original cover engaging tool 320 hooked on the engageable portion 520.

The first protrusion 43 and the second protrusion 53 hold, or are engaged with, the original cover engaging tool 320 hooked on the engageable portion 520. The cover attaching tool 20 has a uniform shape in the longitudinal direction L.

The seat cover 1 has the cover attaching tool 20 in the state where an outer surface 45 of the first side portion 40 is in contact with the rear surface 11 of the cover main body 10 and also the free end portion 41 of the first side portion 40 is aligned with the bottom end 12 of the cover main body 10. In this state, the cover attaching tool 20 is in an inverted posture. The free end portion 41 and the bottom end 12 of the cover main body 10 are sewn together along the bottom end 12 with a sewing thread 80.

Since the first side portion 40 is formed to be higher than the second side portion 50 in the transverse cross-section, the sewing can be done easily.

The seat cover 1 includes three separate cover attaching tools 20 respectively along the bottom ends 12 of the front portion 13, the right side portion 14 and the left portion 15 of the cover main body 10. The separate cover attaching tools 20 of the seat cover 1 form an inverted U shape as seen in a bottom view except for a corner between the bottom ends 12 of the front portion 13 and the right side portion 14 and a corner between the bottom ends 12 of the front portion 13 and the left side portion 15.

The first side portion 40 and the second side portion 50 of each separate cover attaching tool 20 are distanced from each other by the opening width D, which needs to be expanded when the cover attaching tool 20 is inverted from the inverted posture using the free end portion 51 of the second side portion 50 as the fulcrum and is hooked on the original cover engaging tool 320, which is hooked on the engageable portion 520, as described later.

The seat cover 1 is attached to the seat section 200 of the vehicle seat 100 as shown in FIG. 5 through FIG. 7.

First, the cover main body 10 of the seat cover 1 is located on the seat section 20 of the vehicle 100 so as to cover the original cover 301. Next, on, for example, the front portion of the seat section 200, the cover attaching tool 20 provided along the bottom end 12 of the front portion 13 of the cover main body 10 is rotated in a direction of being inverted from the inverted posture while being pulled downward.

Next, the second protrusion 53 of the cover attaching tool 20 is put into contact with the engageable portion 520, with the original cover 301 held therebetween. The cover attaching tool 20 is further rotated in the above-mentioned direction using the free end portion 51 of the second side portion 50 as the fulcrum while the opening width D is expanded. Then, the cover attaching tool 20 is hooked on the original cover engaging tool 320, which is hooked on the engageable portion 520. In this manner, the cover main body 10 is rolled inside the engageable portion 520 and pulled downward, and thus can be attached in close contact with the seat section 200.

Since the first side portion 40 is formed to be higher than the second side portion 50 in the transverse cross-section, a larger part of the cover main body 10 can be pulled downward and inward.

Similarly, on the right and left side portions 315 of the seat section 200, the cover attaching tools 20 provided along the bottom ends 12 of the right side portion 14 and the left side portion 15 of the cover main body 10 are hooked on the engageable portion 520. Thus, the seat cover 1 is attached to the seat section 200.

In the state where the seat cover 1 is attached to the seat section 200, the seat cover 1 is kept in the shape with which the opening width D between the first side portion 40 and the second side portion 50 of the cover attaching tool 20 generally matches the opening width D before the cover attaching tool 20 is hooked on the engageable portion 520. As shown in FIG. 7, the connection portion 30 of the cover attaching tool 20 is in contact with the connection portion 330 of the original cover engaging tool 320.

The second protrusion 53 of the cover attaching tool 20 is engaged with the stopper protrusion 353, which is engaged with the stopper portion 521 of the engageable portion 520. The first protrusion 43 and the second protrusion 53 of the cover attaching tool 20 hold the original cover engaging tool 320 hooked on the engageable portion 520 by an elastic force of the resin.

Embodiment 2

Now, with reference to FIG. 8 and FIG. 9, a seat cover 1' in Embodiment 2 according to the present invention will be described. Identical elements to those of the seat cover 1 in Embodiment 1 will bear identical reference numerals thereto and descriptions thereof will be omitted.

Figure 8:
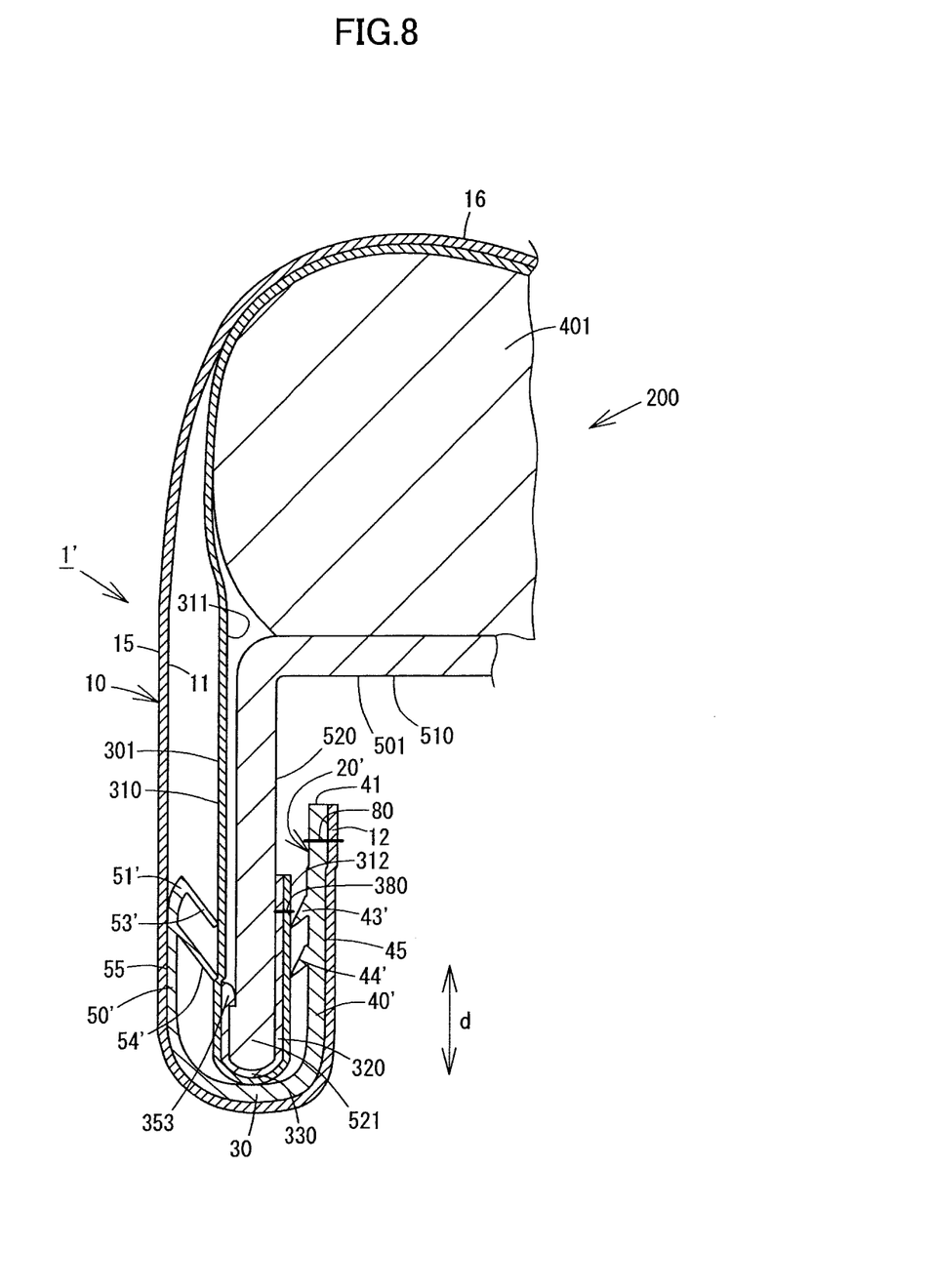
FIG. 8 shows a cross-section of the seat cover in a second embodiment in the state of being attached.

FIG. 8 shows an enlarged partial cross-section of the seat cover 1' attached to the seat section 200 of the vehicle seat 100, corresponding to an enlarged cross-section taken along line A-A in FIG. 1 as viewed in the direction of the arrows of line A-A. FIG. 9 shows an enlarged partial cross-section of the seat cover 1' attached in another manner.

A cover attaching tool 20' of the seat cover 1' includes a first upper protrusion 43' and a first lower protrusion 44' in a first side portion 40' and also includes a second upper protrusion 53' and a second lower protrusion 54' in a second side portion 50'.

In more detail, the cover attaching tool 20' includes the second upper protrusion 53' protruding toward the first side portion 40' and the connection portion 30 from a free end portion 51' of the second side portion 50', and also the second lower protrusion 54' protruding toward the first side portion 40' and the connection portion 30 from an intermediate position in an opening depth direction d of the second side portion 50'.

In addition, the cover attaching tool 20' includes the first upper protrusion 43' and the first lower protrusion 44' protruding toward the second side portion 50' and the connection portion 30 at positions, in the opening depth direction d, which are substantially the same as those of the second upper protrusion 53' and the second lower protrusion 54' of the second side portion 50'.

In the cover attaching tool 20', a minimum distance m between the first side portion 40' and the second side portion 50', namely, the distance m between the first upper protrusion 43' and the second upper protrusion 53' and also between the first lower protrusion 44' and the second lower protrusion 54' is shorter than the thickness W of the original cover 301 at the position of the original cover engaging tool 320 hooked on the engageable portion 520.

The first upper protrusion 43' and the second upper protrusion 53', and the first lower protrusion 44' and the second lower protrusion 54', hold or are engaged with the original cover engaging tool 320 hooked on the engageable portion 520. The cover attaching tool 20' has a uniform shape in the longitudinal direction L.

As shown in FIG. 8, in the state where the seat cover 1' is attached to the seat section 200, the connection portion 30 of the cover attaching tool 20' is in contact with the connection portion 330 of the original cover engaging tool 320.

The second lower protrusion 54' of the cover attaching tool 20' is engaged with the stopper protrusion 353, which is engaged with the stopper portion 521 of the engageable portion 520. The first lower protrusion 44' and the second lower protrusion 54' of the cover attaching tool 20' hold the original cover engaging tool 320 hooked on the engageable portion 520 by an elastic force of the resin.

The cover attaching tool 20' includes the plurality of protrusions which hold, or are engageable with, the original cover engaging tool 320 in the opening depth direction d, and thus can be secured strongly to the engageable portion 520.

Figure 9:
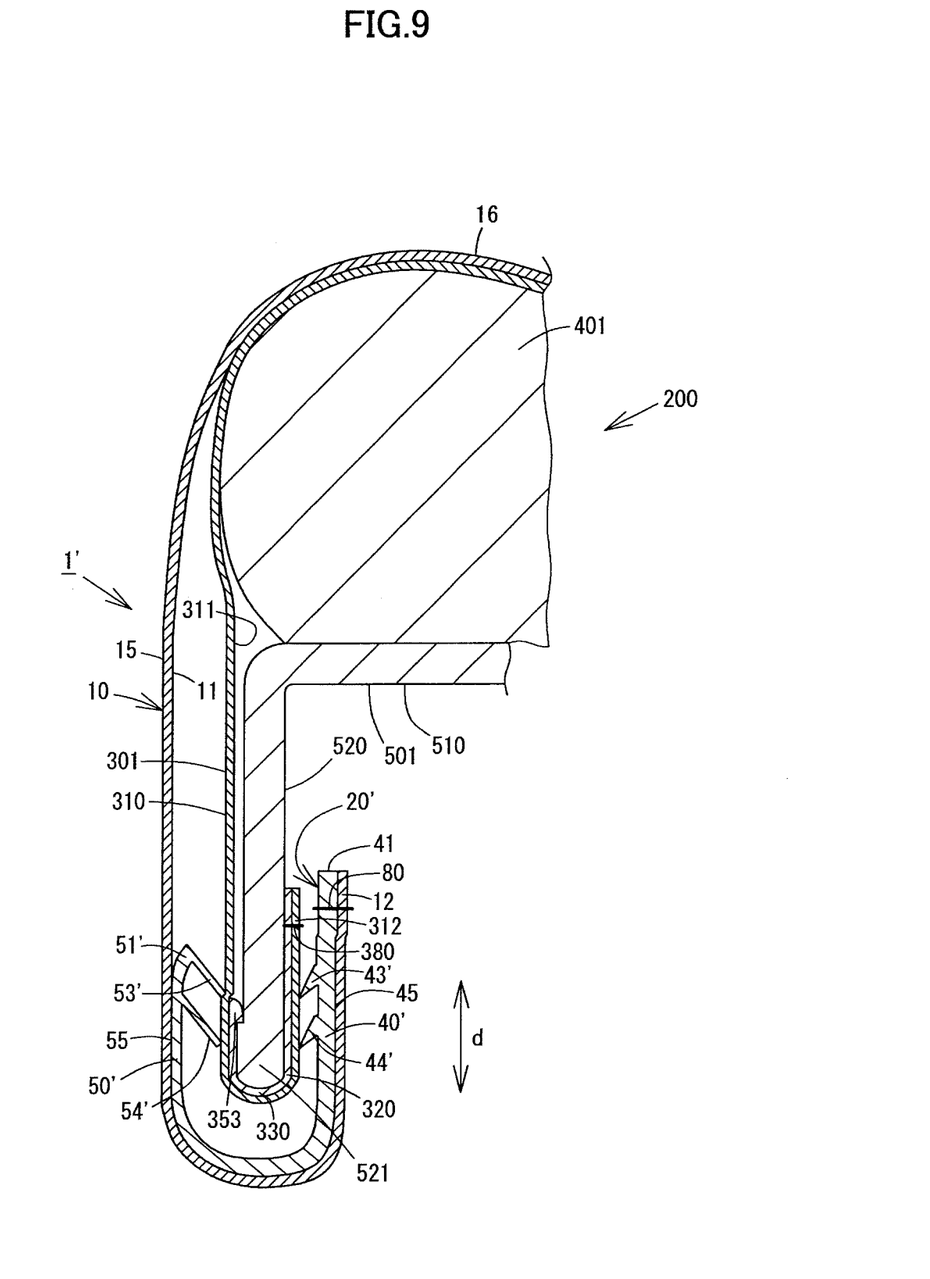
FIG. 9 shows a cross-section of the seat cover in the second embodiment in the state of being attached in another manner.

Owing to this, as shown in FIG. 9, the cover attaching tool 20' may be hooked on the original cover engaging tool 320, which is hooked on the engageable portion 520, in the state where there is a gap between the connection portion 30 and the connection portion 330 of the original cover engaging tool 320. Accordingly, the degree of tension of the cover main body 10 can be adjusted by adjusting the position in the opening depth direction d at which the cover attaching tool 20' is hooked.

Owing to the above-described structure of the seat cover 1, 1', the following functions and effects are provided.

The seat cover 1, 1' includes the cover attaching tool 20, 20', which can be hooked on the original cover engaging tool 320, along the bottom end 12 of the cover main body 10. Therefore, the seat cover 1, 1' can be attached to the seat section 200 by covering the seat section 200 with the cover main body 10, pulling the cover attaching tool 20, 20' downward, and hooking the cover attaching tool 20, 20' on the original cover engaging tool 320, which is hooked on the engageable portion 520.

Accordingly, the seat cover 1, 1' can be attached to the seat section 200 of the vehicle seat 100 in the state of covering the original cover 301 with no need to detach the original cover engaging tool 320 from the engageable portion 520.

The opening width D of the seat cover 1, 1' is wider than the thickness W. Therefore, the cover attaching tool 20, 20' of the seat cover 1, 1' can be hooked, with no need of precise position alignment, on the original cover engaging tool 320, which is hooked on the engageable portion 520 located on the bottom side of the seat section 200, which is a blind spot. Accordingly, the seat cover 1, 1' can be attached to the seat section 200 of the vehicle seat 100 easily.

In addition, generally, the engageable portion 520 of the frame 501 is not subjected to surface treatment such as removal of burr or the like. With a conventional seat cover, when the original cover engaging tool 320 is detached from the engageable portion 520 and the cover attaching tool 920 is hooked, it was necessary to protect the fingers against the burr or the like.

With the seat cover 1, 1', the cover attaching tool 20, 20' can be hooked on the original cover engaging tool 320, which is hooked on the engageable portion 520. Therefore, there is no need to protect the fingers.

In the seat cover 1, 1', the first protrusion 43, the second protrusion 53, etc. toward the connection portion 30. Owing to this, in the seat cover 1, 1', the cover attaching tool 20, 20' can be easily hooked on the original cover engaging tool 320 in the state where the original cover engaging tool 320 is held by, or is engaged with, the first protrusion 43, the second protrusion 53, etc., and also the cover attaching tool 20, 20' can be prevented with certainty from coming off from the original cover engaging tool 320.

In the seat cover 1, 1', the minimum distance m is shorter than the thickness W. Therefore, the cover attaching tool 20, 20' of the seat cover 1, 1' can be hooked on the original cover engaging tool 320 with no need of precise position alignment, and also the position of the cover attaching tool 20, 20' can be secured with respect to the original cover engaging tool 320.

With the cover attaching tool 20, 20', the first side portion 40, 40' and the connection portion 30, and the second side portion 50, 50' and the connection portion 30, are connected to each other in a curve. Therefore, a stress is not easily concentrated on the connection portion, and thus the cover attaching tool 20, 20' is not easily destroyed or plastically deformed.

With the cover attaching tool 20, 20', the first side portion 40, 40' is higher than the second side portion 50, 50' in the transverse cross-section. In addition, the first side portion 40, 40' and the second side portions 50, 50' are distanced from each other by the opening width D, which needs to be expanded when the cover attaching tool 20, 20' is inverted from the inverted posture using the free end portion 51, 51' of the second side portion 50, 50' as the fulcrum and is hooked on the original cover engaging tool 320. Therefore, the cover attaching tool 20, 20' is prevented from coming off from the original cover engaging tool 320 due to an upward pulling force of the cover main body 10.

The end according to the present invention corresponds to the bottom end 12; and similarly, the pair of seat cover portions of the cover attaching tool correspond to the first side portion 40, 40' and second side portion 50, 50';

the one end portions corresponds to the free end portion 51, 51';

the protrusion corresponds to the first protrusion 43, the second protrusion 53, the first upper protrusion 43', the first lower protrusion 44', the second upper protrusion 53' and the second lower protrusion 54'; and a pair of portions of the original cover engaging tool correspond to the first side portion 340 and the second side portion 350.

However, the present invention is not limited to the above-described embodiments, and may be carried out in various other embodiments.

DESCRIPTION OF THE REFERENCE NUMERALS 1, 1' . . . Seat cover
10 . . . Cover main body
12 . . . Bottom end
20, 20' . . . Cover attaching tool
30 . . . Connection portion
40, 40' . . . First side portion
43 . . . First protrusion
43' . . . First upper protrusion
44' . . . First lower protrusion
50, 50' . . . Second side portion
51, 51' . . . Free end portion
53 . . . Second protrusion
53' . . . Second upper protrusion
54' . . . Second lower protrusion
100 . . . Vehicle seat
200 . . . Seat section
301 . . . Original cover
320 . . . Original cover engaging tool
340 . . . First side portion
350 . . . Second side portion
501 . . . Frame
520 . . . Engageable portion
D . . . Opening width
m . . . Minimum gap
S . . . Opening W ... Thickness
d ... Opening depth direction

What is claimed is:

1. A seat cover which is attachable to a seat section of a vehicle seat, including a frame and an original cover, in a state of covering the original cover, which is attached in the state where an original cover engaging tool including a pair of portions facing each other is hooked on an engageable portion of the frame, the seat cover comprising:
   a cover main body for covering the seat section; and
   a cover attaching tool provided along an end of the cover main body;
   wherein:
   the cover attaching tool includes a pair of cover seat portions facing each other and is hook-shaped; and
   the cover attaching tool is allowed to be hooked on the original cover engaging tool hooked on the engageable portion.

2. A seat cover according to claim 1, wherein an opening width of an opening between one end portions of the pair of seat cover portions is larger than a thickness of the original cover at a position of the original cover engaging tool hooked on the engageable portion.

3. A seat cover according to claim 2, wherein at least one of the pair of seat cover portions includes a protrusion which protrudes toward the other of the pair of seat cover portions and is engageable with the original cover engaging tool, or holds the original cover engaging tool together with the other of the pair of seat cover portions.

4. A seat cover according to claim 3, wherein the protrusion protrudes toward a connection portion for connecting another end portions of the pair of seat cover portions to each other.

5. A seat cover according to claim 3 or 4, wherein a plurality of the protrusions are provided in an opening depth direction d of the cover attaching tool.

6. A seat cover according to claims 3, wherein a minimum distance between the pair of seat cover portions is shorter than the thickness of the original cover at a position of the original cover engaging tool hooked on the engageable portion.

7. A seat cover attaching tool included in a seat cover which is attachable to a seat section of a vehicle seat, including a frame and an original cover, in a state of covering the original cover, which is attached in the state where an original cover engaging tool including a pair of portions facing each other is hooked on an engageable portion of the frame, wherein:
   the cover attaching tool includes a pair of seat cover portions facing each other and is hook-shaped; and
   the cover attaching tool is allowed to be hooked on the original cover engaging tool hooked on the engageable portion.

* * * * *